US009830209B2

(12) United States Patent
Morrissey

(10) Patent No.: US 9,830,209 B2
(45) Date of Patent: Nov. 28, 2017

(54) WEB BASED USER INTERFACE DRIVEN PROPHYLACTIC CROSS-DOMAIN COMMUNICATION ARCHITECTURE

(71) Applicant: NETAPP, INC., Sunnyvale, CA (US)

(72) Inventor: Christopher Morrissey, Apex, NC (US)

(73) Assignee: NETAPP, INC., Sunnyvale, CA (US)

( * ) Notice: Subject to any disclaimer, the term of this patent is extended or adjusted under 35 U.S.C. 154(b) by 295 days.

(21) Appl. No.: 14/525,393

(22) Filed: Oct. 28, 2014

(65) Prior Publication Data
US 2015/0242256 A1 Aug. 27, 2015

Related U.S. Application Data

(60) Provisional application No. 61/945,696, filed on Feb. 27, 2014.

(51) Int. Cl.
*G06F 9/54* (2006.01)
*H04L 29/08* (2006.01)

(52) U.S. Cl.
CPC ............ *G06F 9/546* (2013.01); *H04L 67/02* (2013.01); *H04L 67/2823* (2013.01)

(58) Field of Classification Search
CPC ............................ G06F 9/546; H04L 67/2823
USPC .......................................... 709/219; 719/213
See application file for complete search history.

(56) References Cited

U.S. PATENT DOCUMENTS

| | | | | |
|---|---|---|---|---|
| 7,502,745 B1* | 3/2009 | Shawver | ............... | G06Q 10/10 705/1.1 |
| 8,689,099 B1* | 4/2014 | Hanni | ............... | H04L 67/02 715/205 |
| 9,037,963 B1* | 5/2015 | Chandi | ............... | G06F 21/00 715/234 |
| 9,083,566 B1* | 7/2015 | Pearson | ............... | H04L 29/00 |
| 9,424,558 B2* | 8/2016 | Matas | ............... | G06Q 10/107 |
| 2007/0113237 A1* | 5/2007 | Hickson | ............... | G06F 9/542 719/318 |
| 2008/0298342 A1* | 12/2008 | Appleton | ............... | H04L 67/28 370/351 |
| 2008/0301643 A1* | 12/2008 | Appleton | ............... | G06F 8/70 717/124 |
| 2009/0276835 A1* | 11/2009 | Jackson | ............... | G06F 21/54 726/4 |
| 2010/0229243 A1* | 9/2010 | Lin | ............... | G06F 17/30896 726/27 |
| 2011/0055685 A1* | 3/2011 | Jaquish | ............... | G06F 9/4443 715/234 |
| 2012/0047517 A1* | 2/2012 | Townsend | ............... | H04M 3/5191 719/313 |

(Continued)

*Primary Examiner* — Douglas Blair
(74) *Attorney, Agent, or Firm* — Gilliam IP PLLC

(57) ABSTRACT

Techniques to facilitate communication across domains are described. A secondary web server in a second domain provides content to be loaded into a user interface element of a web page provided by a primary web server in a first domain. A user interface component operates as an intermediary for the secondary web server and/or reverse proxy between user interface elements of the different domains. The user interface component processes a message from the secondary web server to verify an origin of the message. If the origin is trusted, the user interface component transforms the message into a request indicating a trusted domain and communicates the request to the first domain.

19 Claims, 11 Drawing Sheets

(56) References Cited

U.S. PATENT DOCUMENTS

2014/0095974 A1\* 4/2014 Cui .................. G06F 21/53
 715/234
2015/0143223 A1\* 5/2015 Kolam .............. G06F 17/2247
 715/234

\* cited by examiner

400

PROCESS MESSAGE FROM SECONDARY APPLICATION
402

VERIFY ORIGIN AS TRUSTED
404

INTERPRET MESSAGE AND TRANSFORM INTO A REQUEST
406

EXCHANGE DATA WITH PRIMARY APPLICATION
408

RETURN DATA TO THE SECONDARY APPLICATION
410

WEB BASED USER INTERFACE DRIVEN PROPHYLACTIC CROSS-DOMAIN COMMUNICATION ARCHITECTURE

RELATED APPLICATION

This application claims the benefit of priority under 35 U.S.C. §119(e) to U.S. Provisional Patent Application 61/945,696 entitled "Techniques To facilitate Communication Across Domains" filed on Feb. 27, 2014, the entirety of which is hereby incorporated by reference.

BACKGROUND

While it is very common for portal-based user interfaces to include information delivered from external providers, a number of issues occur when such interfaces are interacting with an application associated with different domain. In one instance, there is a primary server providing the overall user interface experience and a secondary server that provides content in the user interface. Conventional rich Internet technologies prevent communication from a domain that is different from the primary server. Normally communication is performed by dispatching events through a proxy to give the appearance of originating from the same domain as the primary server. The secondary server and the primary server often communicate by dispatching events through the proxy. This is commonly known as cross-domain communication. However, various problems become apparent when implementing cross-domain communication in practice. Real-world environments can frustrate mechanisms to secure cross-domain communications because, for example, malicious code can infect the primary server or a client device displaying the user interface and cause significant harm. The malicious code may propagate throughout a network and infect other devices and systems. Even when the secondary server is a trusted resource, each domain in that resource requires a code change in the primary application and/or a separate event handler, which can impede product development.

BRIEF DESCRIPTION OF THE DRAWINGS

FIG. 4 illustrates an embodiment of a logic flow for the system of FIG. 1A.

DETAILED DESCRIPTION

Figure 1A:
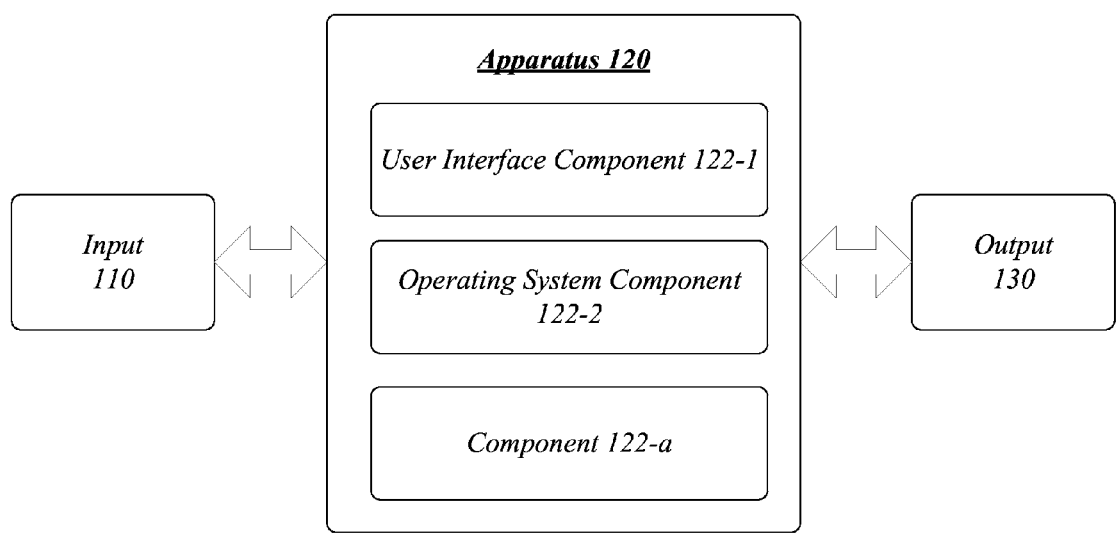
FIG. 1A illustrates an embodiment of a system to enable communication across domains.

Various embodiments are directed to enable communication between applications in different domains. In one embodiment, for example, an apparatus may comprise a user interface component operative on a logic circuit to verify an application's origin prior to operating as a client-based reverse proxy for data communicated to a primary application from that application. This enables communication and interaction between web portal user interface elements corresponding to data from different domains. As a result, the embodiments can improve affordability, scalability, modularity, extendibility, or interoperability for an operator, device or network.

To illustrate the operation of some of these embodiments, consider an example where two web servers, one of which is a primary web server, provide content for a primary web server's user interface page. The other web server, which may be referred to as a secondary web server, is serving content to be shown in various frames (e.g., iframes) in the primary web server's page. The user interface loads content from the secondary server into the user interface page's iframes, specifically into user interface elements, such as a dialog or tab. In order to interact with these and other elements from the primary server, the secondary web server uses a component running JavaScript software code to serve as an intermediary. Using the fifth revision of the hypertext markup language (HTML) standard (HTML5) postMessage( ) function, according to one example implementation, the component provides a conduit or an intermediary for communication between the primary web server and the secondary web server.

Operating as an intermediary, the component may operate as an event mechanism, capable of performing tasks as instructed by the secondary web server and other tasks. Some of these tasks may include closing a dialog when a user is finished or to refresh an element of the primary web server when that element was updated by the secondary web server. Function calls from the secondary web server may purport to originate from the component, which is in the same domain as the primary web server and hence, a trusted domain. The component, therefore, may operate as reverse proxy between user interface elements loaded from separate domains.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise a computer-implemented system 100 having an apparatus 120 comprising one or more components 122-*a*. Although the system 100 shown in FIG. 1 has a limited number of elements in a certain topology, it may be appreciated that the system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-*a* may include components 122-1, 122-2, 122-3, 122-4 and 122-5. The embodiments are not limited in this context.

It is appreciated that the system 100 may include any number of hardware/software components that perform some functionality. The system 100 may comprise the apparatus 120 to enable interaction with multiple software applications, particularly cross-origin communication. Some of these applications may be generally arranged to facilitate user requests for various computing resources. One of these applications may be herein referred to as a primary application. As an example, the primary application may be an Internet or web application operative on an operating system component, such as a browser component, or a component running on remote network device, such as a web server. As another example, the primary application may be a virtualization manager application configured to control other virtualization components distributed throughout a computing enterprise.

The primary application may produce a web page known as a portal owing to a distribution of user interface elements (or simply elements) on the web page that permit navigation and access to content from a number of applications. For example, the primary application may generate an iframe to display content provided by a web server and this content may be facilitated by a script (e.g., JavaScript) running in the iframe. Another application, such as a secondary application, may execute the script to render and display the content in the iframe. A component running in the primary application may include code dedicated to securing cross-origin communication between the secondary application and the primary application. The primary application may use such code as an event mechanism exclusively for the purpose of listening for messages and handling related events instead of implementing code changes for each and every potential domain name. By delegating all or some cross-origin communication security to the above dedicated event mechanism, the primary application may implement a security mechanism that blocks all or some cross-origin communication simplifying security concerns related to web messaging as described herein.

Via the apparatus 120 configured to facilitate operation of the primary application, the user may initiate various processes involving, for example, accessing/modifying stored data, provisioning volumes, instantiating virtual machines and/or the like. One example user interface is described as a primary web page 800 with respect to FIG. 6. It is occasionally desirous to invoke functionality provided by the secondary application when performing the above mentioned processes. One example secondary application, sometimes known as a storage application, allocates storage units for use by the primary application. Another secondary application, sometimes known as a virtualization application, configures various resource capacities and capabilities into virtual machines for use by the primary application.

The apparatus 120 may comprise a user interface component 122-1 to facilitate interaction with any number of secondary applications. The user interface component 122-1 may be generally arranged to facilitate operation of the secondary application and/or the primary application via control elements presented by the apparatus 120. The description herein provides additional details regarding the user interface component 122-1.

Figure 1B:
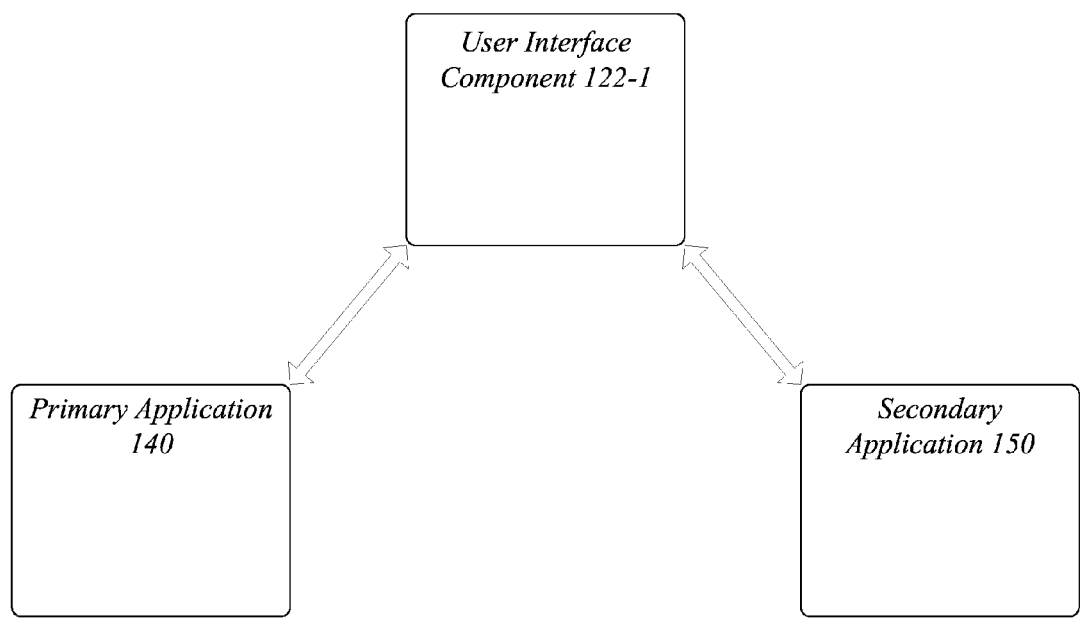
FIG. 1B illustrates an embodiment of a functional view of the system of FIG. 1A.

FIG. 1B illustrates a block diagram of the system 100 in which the user interface component 122-1 enables cross-domain communication between a primary application 140 and a secondary application 150. In one embodiment, the user interface component 122-1 operates a conduit for messages from the secondary application 150 and the primary application 120. These messages may include task information prescribing one or more function calls to execute on the primary application 120. The primary application 140, in turn, modifies content on and/or adds content to a user interface element. As an option, a message may include file data comprising content to render on the user interface element. The primary application 120 may return task results data as a response including a status for each function call and any requested data.

Figure 2:
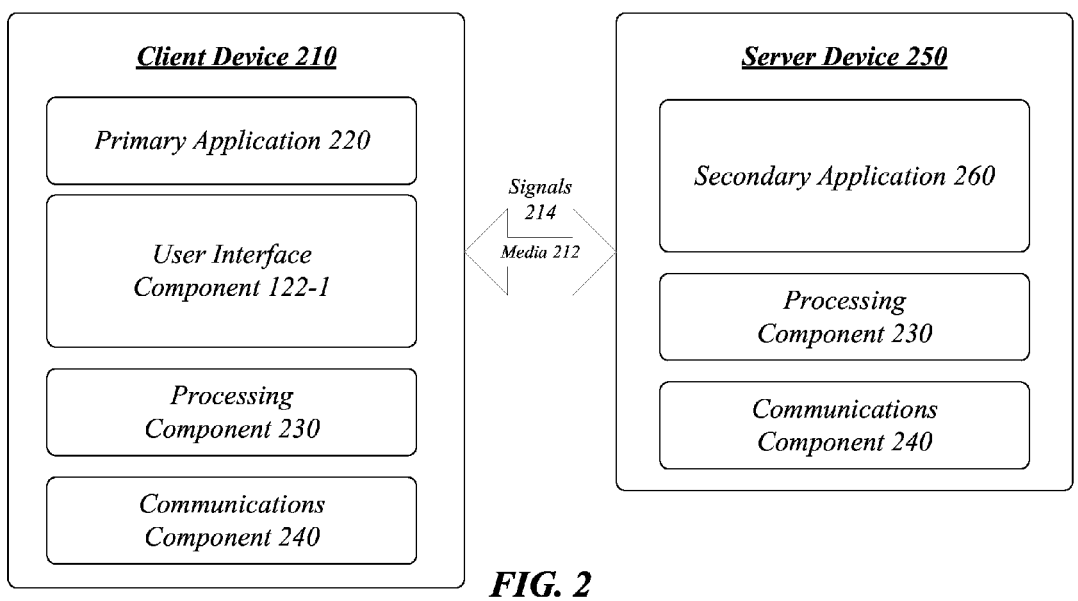
FIG. 2 illustrates an embodiment of a distributed system for the system of FIG. 1A.

FIG. 2 illustrates a block diagram for a distributed system 200. The distributed system 200 may distribute portions of the structure and/or operations for the system 100 across multiple computing entities. Examples of distributed system 200 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 200 may comprise a client device 210 and a server device 250. In one example, the devices 210,250 may communicate over a communications media 212 using communications signals 214 via the communications components 240. The client device 210 may comprise or employ one or more client programs that operate to perform various methodologies in accordance with the described embodiments. In one embodiment, for example, the client device 210 may implement a primary user interface to manage user requests to access various resources and/or to utilize various capabilities of the client device 210.

The client device 210 may execute processing operations or logic for the system 100 using a processing component 230. The processing component 230 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 210 may execute communications operations or logic for the system 100 using communications component 240. The communications component 240 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 240 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

In one embodiment, the client device 210 may implement a primary user interface, such as the apparatus 120 of FIG. 1, to handle user commands directed to a primary application 220 and/or to present on a display device various data provided by the primary application 220. The client device 210 may also implement the user interface component 122-1, as described herein, to handle certain user commands for the primary application 220.

The server device 250 may comprise or employ one or more server programs that operate to perform various methodologies in accordance with the described embodiments. In one embodiment, the server device 250 may implement a secondary application 260 that provides the client device 210 with various content, including data and/or services. The server device 250 may communicate content to the client device 210 to load into the primary user interface 220. Once embedded within the primary user interface 220, the content is operative to communicate with the user interface component 122-1. In one example embodiment, the content via the user interface component 122-1 requests data from the primary application 220. In another embodiment, the user interface component 122-1 communicates with the secondary application 260, when appropriate, to complete tasks for the primary application 220.

The following description illustrates an example operation of the user interface component 122-1 when the secondary application 260 is associated with a domain that is different/unknown to the primary application 220. Alternatively, the domain of the secondary application 260 may be an untrusted domain; in order to remediate the untrusted state, one example implementation of the user interface component 122-1 performs a verification process to determine whether the server device 250 is malicious. If the server device 250 is determined to be secure from malicious software code, the user interface component 122-1 may modify the domain's status to trusted and update information delineating trusted domains accordingly.

Although the client device 210 and the primary application 220 may be in the same domain or, as an alternative, in different domains if the primary application 220 is an external resource such as a cloud resource. In response to user commands submitted through the client device 210, the primary application 220 performs various tasks, such as generating content for display on interface elements (e.g., HTML elements). The primary application 220 may employ the secondary application 260 to provide additional content. When the secondary application 260 desires data and/or services from the primary application 220 (or vice versa), the user interface component 122-1 operates as a conduit for cross-origin communication. In one embodiment, the user interface component 122-1 to listen for messages from the secondary application 260 and executes an event mechanism when these messages are received.

Each message includes information indicating the domain from which the message originated. After verifying the domain is a trusted domain, the user interface component 122-1 sends requests to the primary application 220 for processing. The primary application 220, if possible, performs requested tasks and returns responses that includes task results data to be communicated to the secondary application 260. Such data may include a function call addressed to a domain of the client device 210 that communicates information to the user interface component 122-1. In one embodiment, executing the function may post a message directed towards the Uniform Resource Identifier (URI) of the client device 210 and/or the secondary application 260. The message may include a function that when called and passed parameters, transmits data and/or receives data from the secondary application 260, thereby facilitating communication across domains.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
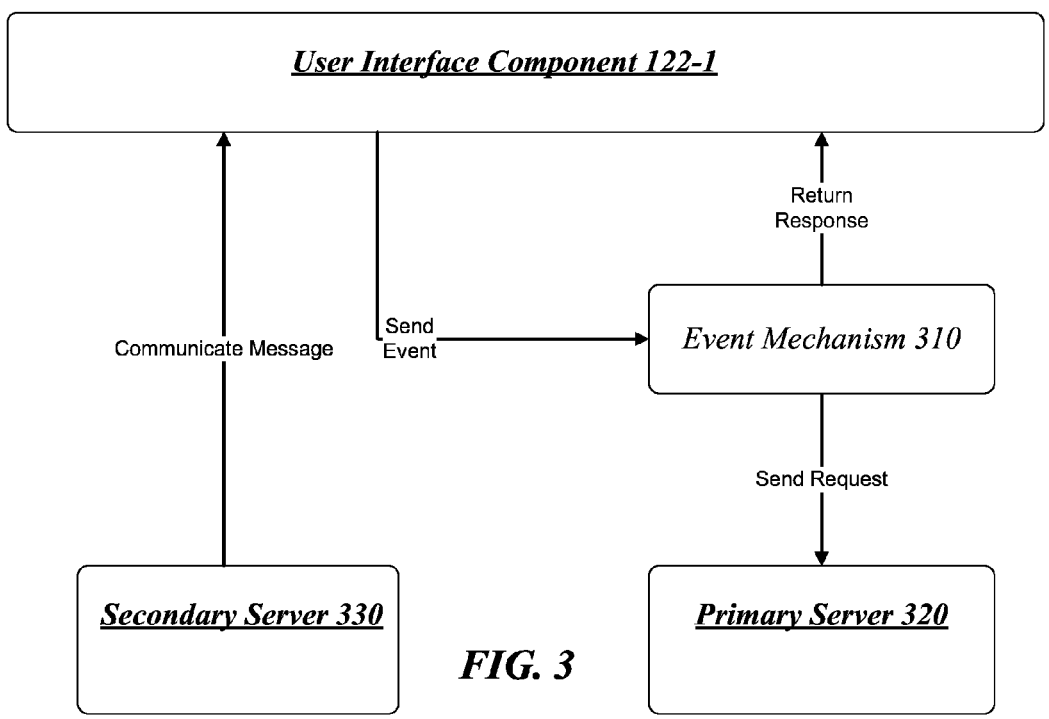
FIG. 3 illustrates an embodiment of an operating environment for the system of FIG. 1A.

FIG. 3 illustrates an embodiment of an operational environment 300 for the system 100. As shown in FIG. 3, components of the operational environment 300 include the user interface component 122-1 operating an event mechanism 310, a primary server 320, and a secondary server 330. The user interface component 122-1 may use the event mechanism 310 to process as events messages from the secondary server 330 and transform these messages into requests for data and/or services from the primary server 320. The primary server 320, in turn, perform various tasks, such as provisioning virtual machines, running computing services over a network, managing storage volumes, and/or the like. The secondary server 330 may use the primary server 320 to authenticate the user for access to that server's applications, storage volumes and/or other resources.

In one embodiment, the solution implemented by the secondary server 330 utilizes HTML5 messaging mechanisms. It is appreciated that other embodiments may implement solutions employing other web messaging mechanisms. The secondary server 330 may provide code (e.g., a script), which when loaded into a user interface element, invokes HTML5 functionality to post a message to the user interface component 122-1. In response, the user interface component 122-1 interprets the message and executes any instructions provided therein. The secondary server 330, for example, may retrieve data from the primary server 320 by communicating the requests through the user interface component 122-1. The primary server 320 may service the requests and return a response to the user interface component 122-1, which relays the response to the secondary server 330. Hence, the user interface component 122-1 operates as a client-side reverse proxy.

FIG. 4 illustrates one embodiment of a logic flow 400. The logic flow 400 may be representative of some or all of the operations executed by one or more embodiments described herein.

In the illustrated embodiment shown in FIG. 4, the logic flow 400 commences operations at block 402 and processes a message from a secondary application as described herein. For example, the secondary application may provide content that causes a message to be communicated to a user interface component (e.g., the user interface component 122-1 of FIG. 1), such as plug-in running JavaScript code.

The logic flow 400 may verify the message's origin as trusted at block 404. For example, the content may provide origin information, such as data identifying the secondary application's domain. The message conveys the origin information to the user interface component, which may compare the origin information with information comprising trusted origins (e.g., trusted domains). For example, if the secondary application's domain matches a domain on a list identifying the trusted domains, the user interface component authorizes the secondary application to interact with the primary application despite being from different domains.

The logic flow 400 may interpret the message's contents and transform the message into a request at block 406. The logic flow 400 may exchange data with the primary application at block 408. For example, the message may include a function call and parameter data. On behalf of the secondary application, the user interface component invokes the function call and passes the parameter data to the primary application. In turn, the primary application executes the function call and returns a response to the user interface component. The embodiments are not limited to this example.

Figure 5A:
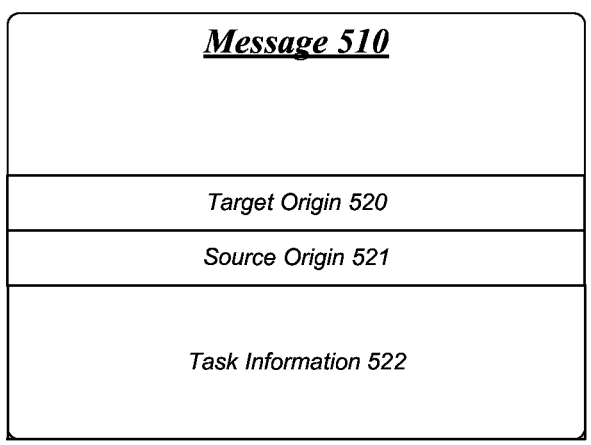
FIG. 5A illustrates an embodiment of a message view of a message.

FIG. 5A illustrates one embodiment of a message view 500 of a message 510. The embodiment depicted in FIG. 5A includes data fields labeled a target origin 520, a source origin 521 and task information 522. Although only three data fields are depicted for the message 510, it is appreciated that other embodiments include additional and/or different data fields.

One example implementation of the system of FIG. 1 includes a user interface component that processes the message 510 and based upon the target origin 520 and the source origin 521, determines that the message 510 is directed to an application serving content from a web server. Another application (e.g., an application associated with a web server in a different domain) may communicate the message 510 using a conduit implemented as the HTML5.postMessage ( ) function, for example. The message 510 may be dispatched to the other application as an event. The user interface component, actively listening for the event, receives the event's notification and executes an event mechanism to handle the event. In this capacity, the user interface component operates as a virtual or exclusive event handler for any message communicated to the application. When the user interface component processes the task information 522 stored within the message 510, the user interface component extracts content, such as data describing function calls for invocation.

Figure 5B:
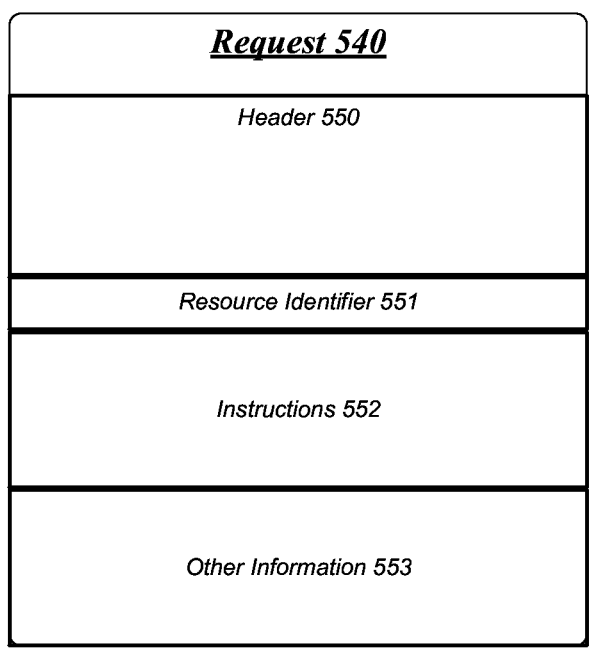
FIG. 5B illustrates an embodiment of a request view of a request.

FIG. 5B illustrates one embodiment of a request view 530 of a request 540. The embodiment depicted in FIG. 5B includes a header 550, a resource identifier 551, instructions 552 and other information 553 as data fields. Although only three data fields are depicted for the message 510, it is appreciated that other embodiments include additional and/or different data fields.

The resource identifier 551 may store domain information purporting to be a trusted domain. Therefore, receipt of the request 540 at the application may authorize execution of the instructions 552. In one embodiment, the domain information may indicate a domain that is the same as the domain of the application or, alternatively, a different domain that is trusted by the application. The domain information may be an actual domain of the other application. The user interface component may compare the resource identifier 551 to a list of trusted domains to determine whether the other application's content is to be accepted. However, in some embodiments, the user interface component may insert a trusted domain into the resource identifier 551, replacing the actual domain of the message 510 source, to bypass the application's security mechanism and effectuate cross-origin communication between the application and the other application.

The user interface component may execute function calls identified in the instructions 552. One example function call invokes one of the application's functions whose operations cause various content to be rendered and displayed through an element on a web page (portal). The application may control access to the content on the element or may delegate that action to yet another application. Another example function call returns various data to the user interface component, including data requested by the other application in the task information 523 of the message 510 in FIG. 5A. It is appreciated that this may be accomplished asynchronously via an operation that places a response message in a message queue comprising outgoing communications (e.g., via a PostMessage( ) function call). The user interface component, in turn, returns the requested data to the other application.

Figure 5C:
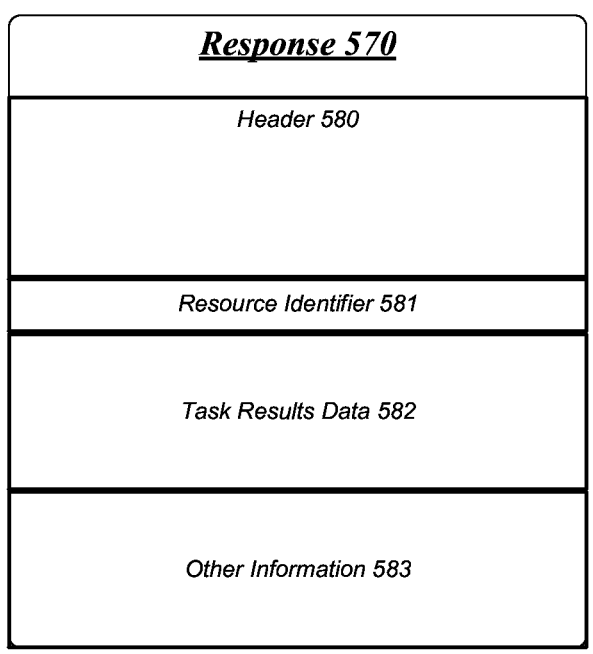
FIG. 5C illustrates an embodiment of a response view of a response.

FIG. 5C illustrates one embodiment of a response view 560 of a response 570. The embodiment depicted in FIG. 5C includes a header 580, a resource identifier 581, task results data 582 and other information 553 as data fields. Although only three data fields are depicted for the message 510, it is appreciated that other embodiments include additional and/or different data fields. The response 570 corresponds to the request 530 of FIG. 5B according to one embodiment. The resource identifier 581 may refer to a domain of the application or the trusted domain in the resource identifier 551.

The application may return the response 570 to the user interface component, which communicates the task results data 582 to the other application either asynchronously or synchronously. The user interface component, operating as a conduit, may also communicate data specifically requested by the other application. This data may be stored in the data field labeled the other information 583.

Figure 6:
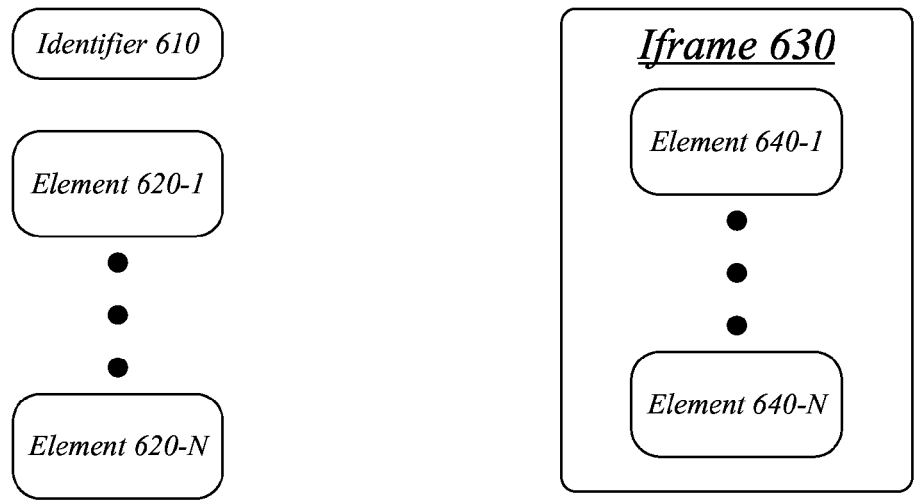
FIG. 6 illustrates an embodiment of a primary web page.

FIG. 6 illustrates one embodiment of a primary web page 600. Various elements of the primary web page 600 include an identifier 610, a plurality of elements 620 and an iframe 630 comprising a plurality of elements 640. The primary web page 600 represents a portal-based user interface. The identifier 610 may include any data related to the primary web page 600, such as a portal name, a resource identifier and so forth. The plurality of elements 620 correspond to content from a primary application and operate under the primary application's control. The iframe 630 may comprise a portion of a window designated for a secondary application's use. The plurality of elements 640 display rendered content provided by the secondary application. Using a component of the portal-based user interface known herein as a user interface component, the secondary application may request data from the primary application and/or generate content for display on the plurality of elements 640. The secondary application may use the user interface component to communicate data for display on the plurality of elements 620. The secondary application may send data to update existing data being displayed on one of these elements by inserting a function call in a message communicated to the user interface component.

It is appreciated that the primary application may delegate any number of management functions to the user interface component for the purpose of controlling the plurality of elements 620, particularly with respect to the content being displayed and/or scripts being executed. If necessary, the user interface component can close any one of the plurality of elements 620 and/or open another element in a same or different area of the primary web page 600. The user interface component may change the configuration of any of the plurality of elements 620 as instructed by the secondary application. For example, the secondary application may direct the user interface component 620 to run a different script on a particular element. As another example, the secondary application may direct the user interface component 620 to modify or close a parent window and propagate additional changes to the plurality of elements 620.

It is also appreciated that the primary web page 600 may be deployed in any number of contexts and operating environments. For example, the primary web page 600 may use the plurality of elements 620 to represent a number of different resources in a cloud computing environment. The primary application allocates groups of resources to computing devices connected to the primary application over a network. The secondary application is provided with various information from these computing devices and generates a conduit through which some information is communicated to the primary application for display in the plurality of elements 620. As another example, a number of computing devices in an on-premises system (e.g., an enterprise computing system) may run multiple programs directed to provide various data (e.g., monitoring information) to the secondary application running in the iframe 630. Some data may be displayed in the plurality of elements 640 or may be communicated through the conduit to the plurality of elements 620. The user interface component, on behalf of a computing device, may instruct the primary application to communicate data (e.g., code) to another computing device for execution. Via the user interface component, all forms of interaction are enabled between the primary application and the secondary application in a different domain.

Figure 7:
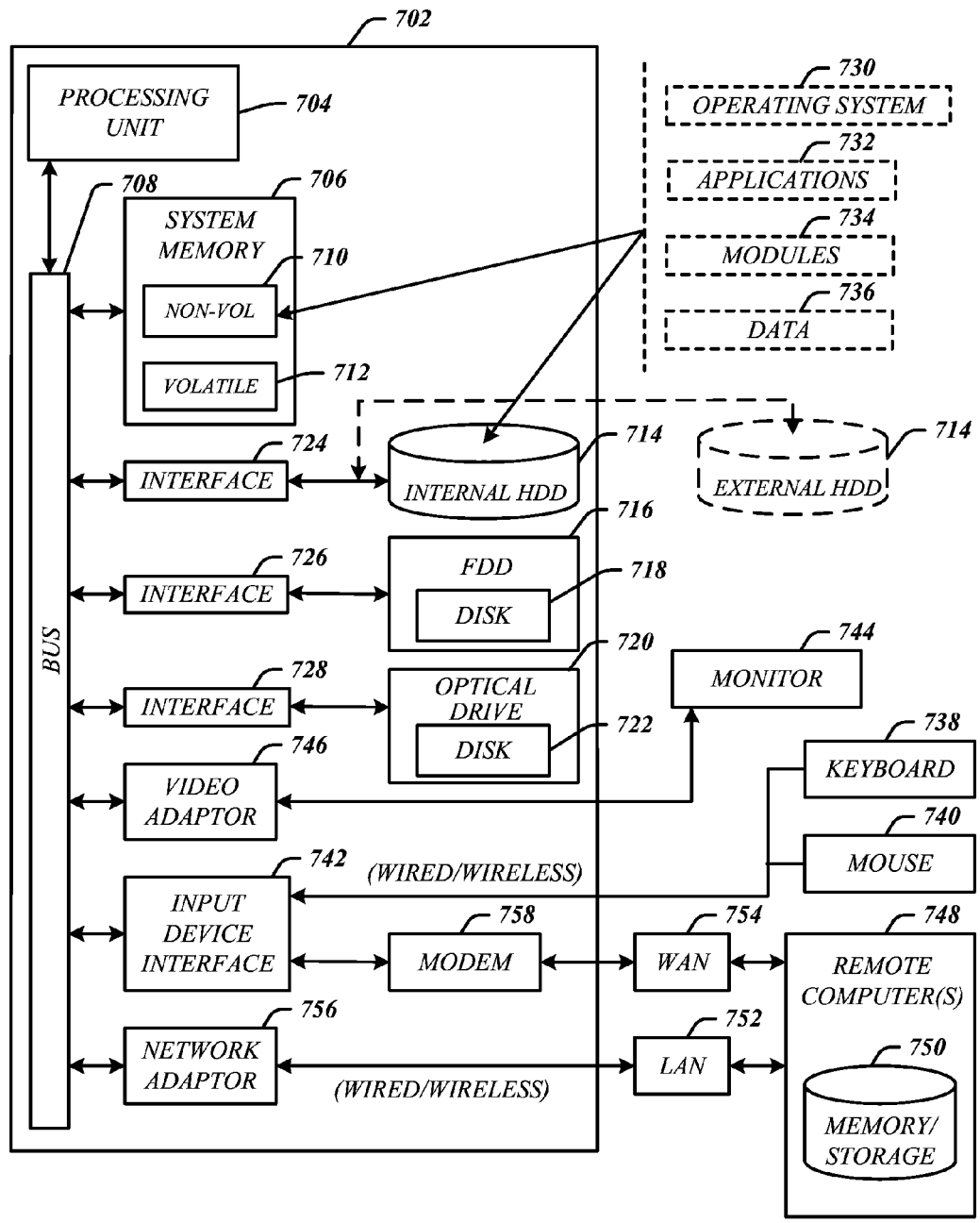
FIG. 7 illustrates an embodiment of computing architecture.

FIG. 7 illustrates an embodiment of an exemplary computing architecture 700 suitable for implementing various embodiments as previously described. In one embodiment, the computing architecture 700 may comprise or be implemented as part of an electronic device. Examples of an electronic device may include those described with reference to FIG. 2, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
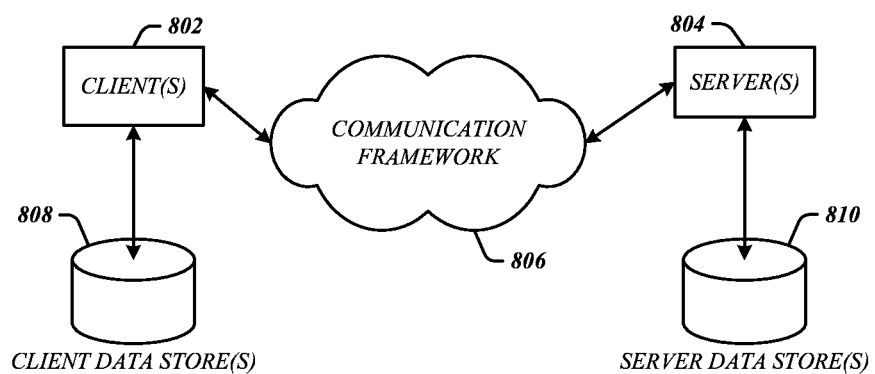
FIG. 8 illustrates an embodiment of communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 comprises includes one or more clients 802 and servers 804. The clients 802 may implement the client device 210. The servers 804 may implement the server device 250. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a processor; and
a computer-readable medium comprising user interface component program code executable by the processor to cause the apparatus to,
listen for an event message that targets an inline frame of a user interface web page generated by a first web application;
based on detection of an event message, determine, from the event message, a first domain and a second domain identified in the event message, wherein a second web application generated the event message and the event message comprises a function call and a first parameter for the function call;
verify the second domain as trusted for the first web application;
based on verification that the second domain is trusted, transform the event message into a request indicating trust and indicating the function call and the first parameter; and
communicate, from within the first domain, the request to the first web application to update content presented by the first web application via the inline frame based on execution of the function call.

2. The apparatus of claim 1, wherein the user interface component program code to transform the message into a request indicating trust comprises program code to generate the request with an indication of the first domain instead of the second domain as an origin of the request.

3. The apparatus of claim 1, wherein the event message is generated in response to a post message function invoked by the second web application, wherein a second parameter of the post message function comprises the function call and the first parameter.

4. The apparatus of claim 1, wherein the user interface component program code comprises program code executable to invoke the function call and pass the first parameter to the first web application for the first web application to execute the function call with the first parameter.

5. The apparatus of claim 4, wherein the function call comprises a call to a function to allocate a storage unit, manage a storage unit, provision a virtual machine, or configure a virtual machine.

6. The apparatus of claim 1, wherein the user interface component program code to determine the first domain and the second domain identified in the event message comprises the program code to determine a first uniform resource identifier corresponding to the first domain and a second uniform resource identifier corresponding to the second domain.

7. A computer-implemented method, comprising:
instantiating a user interface component as a client-based reverse proxy to listen for event messages that target an inline frame associated with the user interface component, wherein a first web server of a first domain generated a web-based user interface comprising user interface elements and the inline frame;
detecting, by the user interface component, an event message having an origin domain corresponding to a second web server, wherein the event message comprises a function call and a first parameter for the function call;
determining, by the user interface component, from the event message a first uniform resource identifier corresponding to the first domain and a second uniform resource identifier corresponding to the origin domain and the user interface component;
comparing, by the user interface component, the origin domain to information comprising trusted origins to verify the origin domain of the second web server as trusted;
based on verification of the origin domain as trusted, the user interface component generating a request message that indicates a trusted domain, the function call, and the first parameter; and
communicating, from the user interface component to the first web server, the request message.

8. The method of claim 7, wherein generating the request message that indicates the trusted domain comprises generating the request message to indicate the first domain instead of the origin domain based on verification of the origin domain as trusted.

9. The method of claim 7 further comprising generating content for display in the inline frame based on execution of the function call with the first parameter by the first web server.

10. The method of claim 7 further comprising the second web server invoking a post message function which causes generation of the event message, wherein a second parameter of the post message function comprises the function call and the second parameter.

11. The method of claim 7, wherein communicating the request message to the first web server comprises the user interface component invoking the function call and passing the first parameter to the first web server.

12. The method of claim 11 further comprising the first web server executing the function call with the first parameter based on invocation of the function call by the user interface component.

13. The method of claim 11, wherein the function call comprises a call to a function to allocate a storage unit, manage a storage unit, provision a virtual machine, or configure a virtual machine.

14. One or more non-transitory computer-readable media comprising program code for secure user-interface based cross-domain communications, the program code executable to:
listen for an event message that targets an inline frame of a user interface web page generated by a first web application;
based on detection of an event message, determine, from the event message, a first domain and a second domain identified in the event message, wherein a second web application generated the event message and the event message comprises a function call and a first parameter for the function call;
verify the second domain as trusted for the first web application;
based on verification that the second domain is trusted, transform the event message into a request indicating trust and indicating the function call and the first parameter; and
communicate, from within the first domain, the request to the first web application to update content presented by the first web application via the inline frame based on execution of the function call.

15. The one or more computer-readable media of claim 14, wherein the program code to transform the message into a request indicating trust comprises program code to generate the request with an indication of the first domain instead of the second domain as an origin of the request.

16. The one or more computer-readable media of claim 14, wherein the event message is generated in response to a post message function invoked by the second web application, wherein a second parameter of the post message function comprises the function call and the first parameter.

17. The one or more computer-readable media of claim 14, wherein the program code comprises program code executable to invoke the function call and pass the first parameter to the first web application for the first web application to execute the function call with the first parameter.

18. The one or more computer-readable media of claim 17, wherein the function call comprises a call to a function to allocate a storage unit, manage a storage unit, provision a virtual machine, or configure a virtual machine.

19. The one or more computer-readable media of claim 14, wherein the program code to determine the first domain and the second domain identified in the event message comprises the program code to determine a first uniform resource identifier corresponding to the first domain and a second uniform resource identifier corresponding to the second domain.

\* \* \* \* \*